United States Patent
Shavrnoch et al.

(10) Patent No.: US 8,479,605 B2
(45) Date of Patent: Jul. 9, 2013

(54) ROTARY-TO-LINEAR MECHANISM HAVING AN ISOLATOR

(76) Inventors: James J. Shavrnoch, Frankenmuth, MI (US); Tony M. Dodak, Montrose, MI (US)

(*) Notice: Subject to any disclaimer, the term of this patent is extended or adjusted under 35 U.S.C. 154(b) by 214 days.

(21) Appl. No.: 13/063,818

(22) PCT Filed: Sep. 18, 2009

(86) PCT No.: PCT/US2009/057456
§ 371 (c)(1), (2), (4) Date: Mar. 14, 2011

(87) PCT Pub. No.: WO2010/033788
PCT Pub. Date: Mar. 25, 2010

(65) Prior Publication Data
US 2011/0167940 A1    Jul. 14, 2011

Related U.S. Application Data

(60) Provisional application No. 61/098,266, filed on Sep. 19, 2008.

(51) Int. Cl.
*F16H 35/00* (2006.01)

(52) U.S. Cl.
USPC ............ 74/388 PS; 74/89.36; 180/443

(58) Field of Classification Search
USPC ..... 74/388 PS, 89.36, 89.42, 89.45; 180/400, 180/443, 444, 446
See application file for complete search history.

(56) References Cited

U.S. PATENT DOCUMENTS

| | | | |
|---|---|---|---|
| 3,572,157 A | 3/1971 | Adams et al. | |
| 4,223,254 A * | 9/1980 | Adams | 318/2 |
| 4,572,314 A | 2/1986 | Anguera | |
| 4,735,271 A * | 4/1988 | Shimizu | 180/446 |
| 4,918,921 A * | 4/1990 | Leigh-Monstevens et al. | 60/545 |
| 5,738,181 A * | 4/1998 | Kato | 180/400 |
| 6,244,125 B1 * | 6/2001 | Sano | 74/388 PS |
| 6,422,334 B1 * | 7/2002 | Cole | 180/444 |
| 6,659,219 B2 * | 12/2003 | Okada et al. | 180/444 |
| 6,883,635 B2 | 4/2005 | Lynn et al. | |
| 7,293,626 B2 | 11/2007 | Ozsoylu et al. | |
| 8,235,165 B2 * | 8/2012 | Birkwald et al. | 180/444 |

FOREIGN PATENT DOCUMENTS

| | | | |
|---|---|---|---|
| JP | 2005-180604 | * | 7/2005 |
| JP | 2007106357 A | | 4/2007 |

OTHER PUBLICATIONS

International Search Report for PCT/US2009/057456 dated Nov. 16, 2009.
Written Opinion of the International Searching Authority for PCT/US2009/057456 dated Nov. 16, 2009.
Extended European Search Report of Application No. 09815256.4, Rotary-to-Linear Mechanism Having An Isolator, corresponding to PCT/US2009/057456 Filing Date Sep. 18, 2009, Mailing date Jul. 4, 2012, 10 pages.

* cited by examiner

*Primary Examiner* — David M Fenstermacher
(74) *Attorney, Agent, or Firm* — Cantor Colburn LLP

(57) ABSTRACT

A rotary-to-linear mechanism including an elongate linearly-moveable first member having a longitudinal first axis, and rotatably-moveable second and third members. The second member is rotatably disposed about the first member and defines a second axis about which it is rotatable. The third member encircles the first axis and is operatively engaged with the first member. The third member is disposed in a central cavity of the second member and has an axial surface superposing a second member interior surface, the superposed surfaces each defining one of a pair of corresponding grooves each encircling the first and second axes.

20 Claims, 6 Drawing Sheets

ROTARY-TO-LINEAR MECHANISM HAVING AN ISOLATOR

CROSS-REFERENCES TO RELATED APPLICATIONS

This patent application claims the benefit of International Application Ser. No. PCT/US2009/057456, filed Sep. 18, 2009, which claims the benefit of Provisional Patent Application Ser. No. 61/098,266, filed Sep. 19, 2008 the disclosure of each are incorporated herein by reference in their entirety.

BACKGROUND OF THE INVENTION

Electrically actuated or electrically assisted steering systems including rotary-to-linear mechanisms such as ball-screw assemblies provide power assist to a steering assembly, for example, by providing a nut surrounding and threadably engaged with a screw portion of a rack such that rotation of the nut by a motor imparts axially directed force to the rack, thereby assisting the driver in steering the vehicle. In a ball-screw assembly, the threaded engagement of the nut and screw is through a plurality of balls disposed in threads or ball grooves formed in the ball-nut and ball-screw. However, deflection of the nut or screw may cause misalignment that results in high friction between the nut and screw, and excessive wear and tear of the mechanism.

It is desirable to accommodate such misalignment while maintaining performance of the mechanism.

SUMMARY OF THE INVENTION

The present invention provides a rotary-to-linear mechanism including an elongate linearly-moveable first member having a longitudinal first axis. A rotatably-moveable second member is rotatably disposed about the first member and defines a second axis about which it is rotatable. The second member has interior surfaces between which is a central cavity through which the first and second axes extend. A rotatably-moveable third member encircles the first axis and is operatively engaged with the first member, linear movement of the first member along the first axis relative to the third member induced by rotational movement of the third member about the first axis relative to the first member. The third member is disposed in the central cavity and has an axial surface superposing a second member interior surface, the superposed surfaces each defining one of a pair of corresponding grooves, each of the grooves encircling the first and second axes. An annular elastomeric isolator member is disposed in the pair of corresponding grooves, and has a first elastic deformation in compression between the second and third members. The annular isolator member has frictional engagement with surfaces of the pair of corresponding grooves, and the second and third members are rotatably coupled through the frictional engagement. The third member has multiple degrees of freedom relative to the second member, with relative movement therebetween opposed by a second elastic deformation of the annular isolator member.

The rotatably-moveable second and third members and the isolator member(s) of the above-described rotary-to-linear mechanism provide an isolator assembly separable from its first member.

The present invention also provides an isolator assembly including a rotatably-moveable container defining a container axis about which it is rotatable and having interior surfaces between which is a central cavity through which the container axis extends. The isolator assembly further includes a rotatably-moveable ball-nut having a bore through which the container axis extends, the ball-nut disposed in the central cavity and having opposing axial surfaces superposing the container interior surfaces. The superposed surfaces each define one of a pair of corresponding grooves, each of the grooves encircling the container axis. An annular elastomeric isolator member is disposed in each pair of corresponding grooves, and has a first elastic deformation in compression between the container and the ball-nut. Each annular isolator member has frictional engagement with surfaces of its respective pair of corresponding grooves, the container and the ball-nut rotatably coupled through the frictional engagement. The ball-nut has multiple degrees of freedom relative to the container, with relative movement therebetween opposed by a second elastic deformation of the annular isolator member.

BRIEF DESCRIPTION OF THE DRAWINGS

Advantages of the present invention will be readily appreciated, as the same becomes better understood by reference to the following detailed description when considered in connection with the accompanying drawings wherein.

Figure 1:
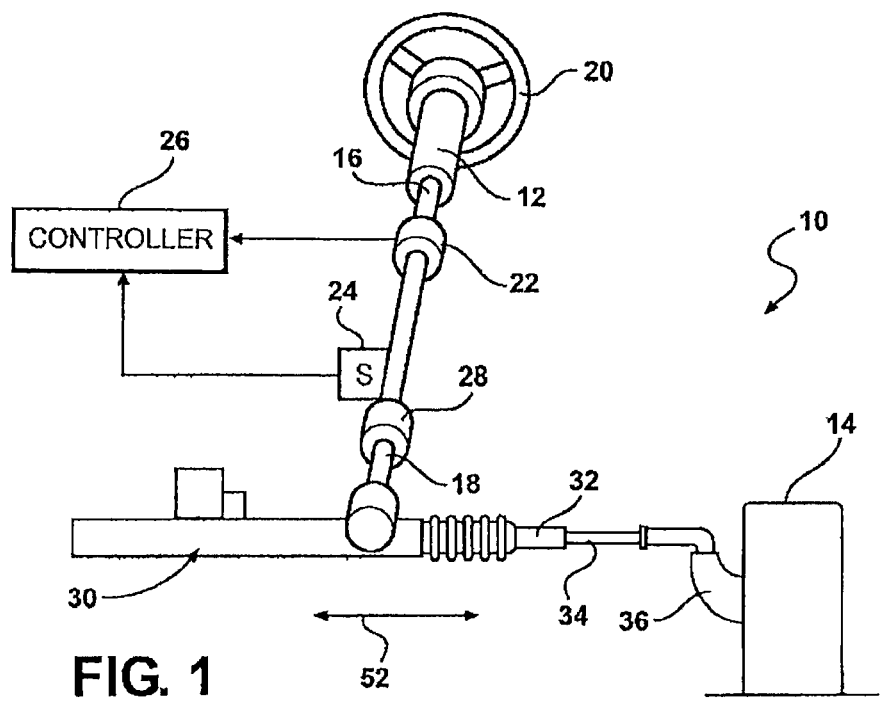
FIG. 1 is a schematic illustration of a steering system for a vehicle.

Moreover, it is to be noted that the Figures are not necessarily drawn to scale and are not necessarily drawn to the same scale. In particular, the scale of some of the elements of the Figures may be greatly exaggerated to emphasize characteristics of the elements. Elements shown in more than one Figure that may be similarly configured have been indicated using the same reference numerals.

DETAILED DESCRIPTION

Referring to FIG. 1, steering system 10 for use in a vehicle (not shown) is illustrated. Steering system 10 allows the operator of the vehicle to control the direction of the vehicle through the manipulation of a steering column 12. Steering column 12 is mechanically connected to road wheels 14 (only one shown).

Steering column 12 includes upper steering shaft 16 and lower steering shaft 18. Hand wheel 20 is disposed at upper steering shaft 16. Hand wheel 20 is positioned so that the operator can apply a rotational force to steering column 12.

Torque sensor 22 and position sensor 24 are located at upper steering column shaft 16 to detect the turning angle of hand wheel 20. Torque sensor 22 and position sensor 24 are in electronic communication with controller 26. Column universal joint 28 couples upper steering column shall 16 to lower steering column shaft 18. Lower steering column shaft 18 is secured at one end to column universal joint 28, and to steering gear assembly 30 at the other end. Gear assembly 30 includes elongate rack 32 having longitudinal axis A along which it linearly translates. The opposed axial ends of rack 32 are coupled to the vehicle's road wheels 14 through steering linkage that includes tie rods (only one show) 34 each secured to rack 32 at one end, and to one of a pair steering knuckles 36 (only one shown) at the other end.

Steering gear assembly 30 further includes pinion gear 38 in mechanical connection with rack 32. Pinion gear 38 is positioned to make contact with matching toothed portion 40 of rack 32 that extends along a segment of rack 32. Pinion gear 38 has teeth that are engaged with teeth of matching toothed portion 40. Pinion gear 38, in combination with matching toothed portion 40 of rack 32, form rack and pinion gear set 42. Rack 32 also has an axially extending segment along which is provided generally cylindrical ball-screw portion 44 centered about axis A. Matching toothed portion 40 and ball-screw portion 44 are integrated into rack 32. Ball-screw 44 is in mechanical communication with reversible servomotor 46, and ball-screw 44 and motor 46 may be located axially along rack 32 on either first side 200 or opposite second side 202 of matching toothed portion 40. In addition, motor 46 may be located radially either on top side 204 or bottom side 206 of rack 32. Actuation of servomotor 46 is controlled by controller 26.

When the operator of the vehicle turns hand wheel 20, a rotational force is applied to steering column 12 and pinion gear 38 is accordingly rotated. The movement of pinion gear 38 causes the axial movement of rack 32 in the direction of arrows 52, which in turn manipulates tie rods 34 and knuckles 36 in order to reposition road wheels 14 of the vehicle. Accordingly, when hand wheel 20 is turned, pinion gear 38 and matching tooth portion 40 convert rotary motion of hand wheel 20 into linear motion of rack 32. In order to assist the operator-applied force to steering system 10, motor 46 is energized and provides power assist to the movement of rack 32 through ball-screw 44, thereby aiding in the steering of the vehicle by the vehicle operator.

Figure 3:
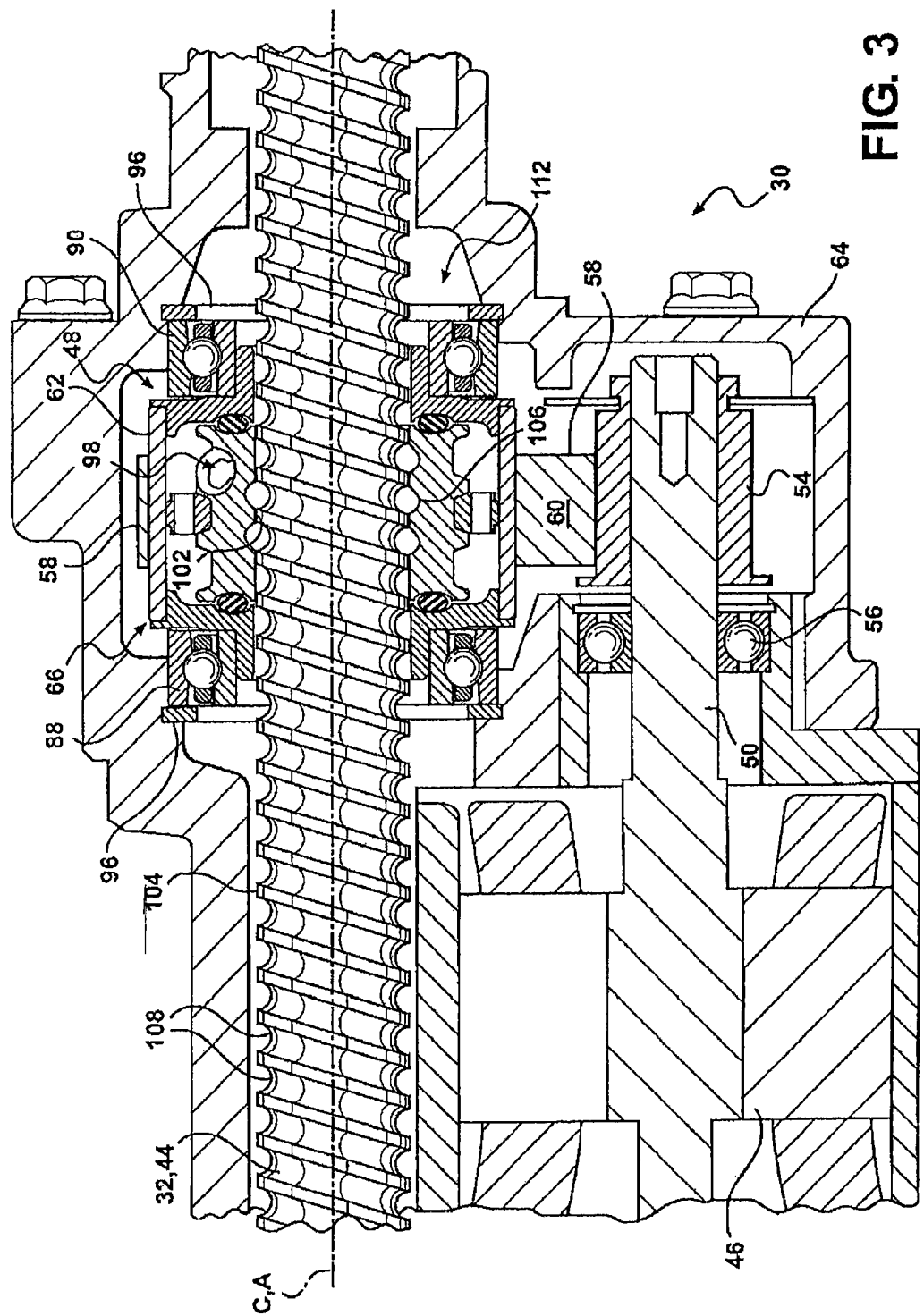
FIG. 3 is a fragmented, cross-sectional view of a portion of the steering system of FIG. 1 showing its ball-screw assembly in an aligned state wherein axes A and C are collinear.

Referring to FIG. 3, reversible servomotor 46 is in operable communication with ball-screw 44 through ball-nut and isolator assembly (hereafter also referred to as "isolator assembly") 48 rotatably disposed about ball-screw 44 and rotatably coupled to motor 46. Isolator assembly 48 is a component separable from ball-screw 44 and rack 32, and is assembled thereon. Shaft 50 extends from motor 46 substantially in parallel with rack 32, and is rotated in one of two opposite angular directions when motor 46 is energized. Shaft 50 has driving pulley 54 rotatably fixed thereto, and is supported by bearing 56. Flexible, endless drive belt 58, which has an outer surface (not shown) and inner surface 60, is wrapped around driving pulley 54 such that inner surface 60 of belt 58 is in frictional contact with pulley 54. Belt 58 also wraps around driven pulley 62 defining the outer circumference of isolator assembly 48 such that inner surface 60 of belt 58 is in frictional contact with pulley 62. Motor 46, shaft 50, belt 58, isolator assembly 48 and rack and pinion gear set 42 may all be contained in steering gear assembly housing 64.

Figure 4:
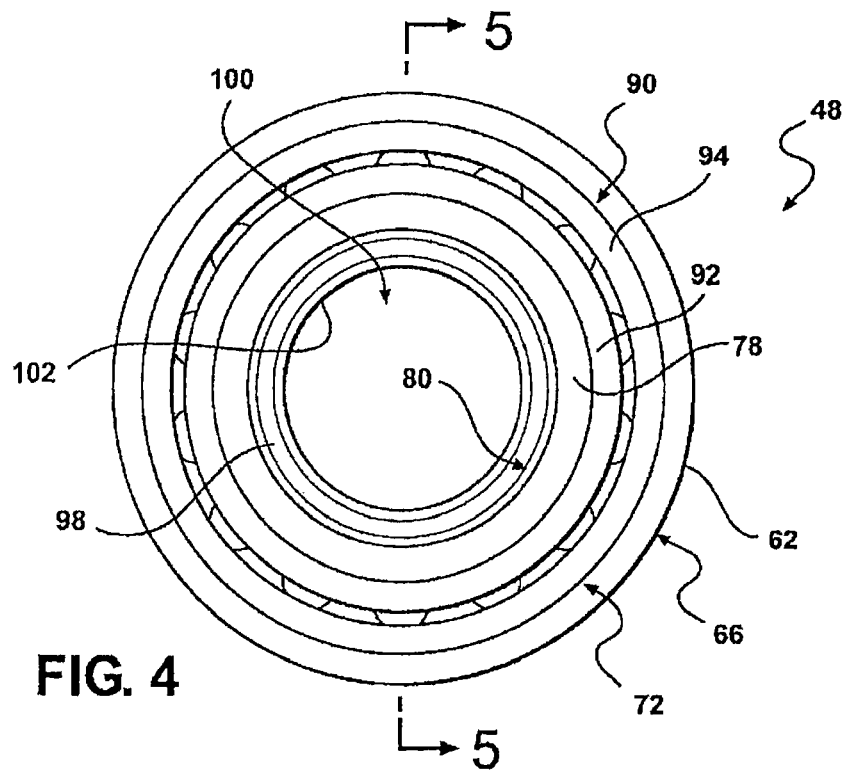
FIG. 4 is an axial end view of the ball-nut and isolator assembly shown in FIG. 3.
Figure 5:
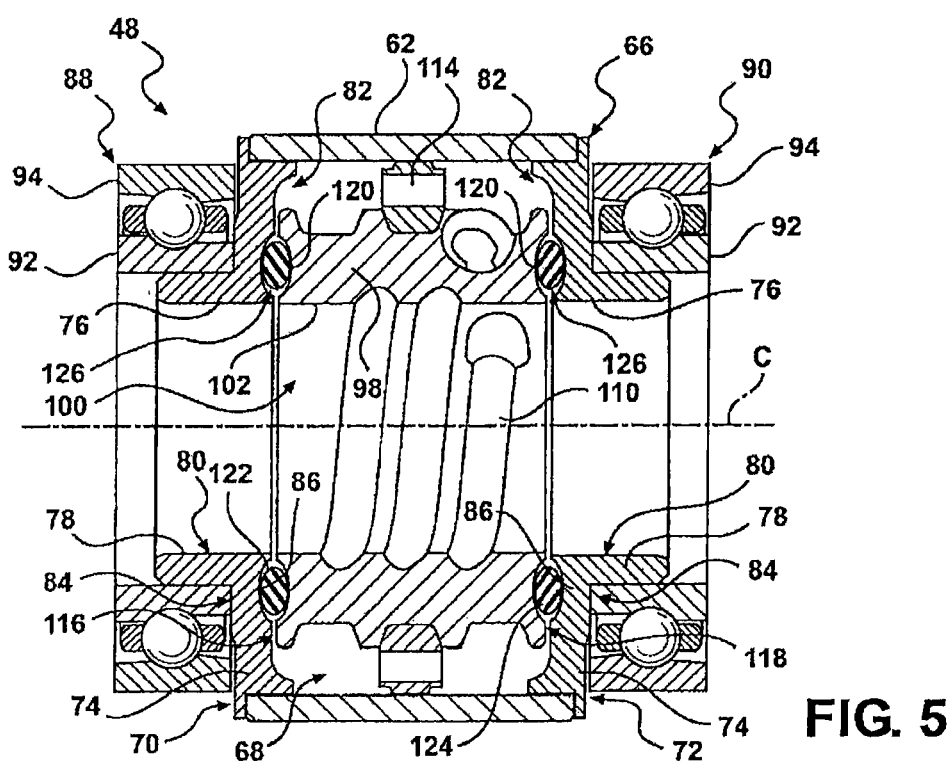
FIG. 5 is a cross-sectional view of the isolator assembly and bearings of FIG. 4, taken along line 5-5.

Referring to FIGS. 3-5, pulley 62 defines central axis C about which it is radially centered and comprises the radially outer surface of cylindrical ball-nut container 66 of isolator assembly 48. When motor 46 is actuated, movement of belt 58 linking pulleys 54 and 62 causes ball-nut container 66 to rotate about central axis C and ball-screw 44.

Ball-nut container 66 has cylindrical central cavity 68 enclosed by pulley 62 and first and second end covers 70, 72. First end cover 70 of container 66 is attached to one axial end of pulley 62 and second end cover 72 of container 66 is attached to the opposite axial end of pulley 62, with first and second end covers 70, 72 spaced from each other along central axis C. More specifically, first and second end covers 70, 72 each includes planar, annular first portion 74 having central aperture 76 and extending radially relative to central axis C. The outer circumference of first portion 74 is attached to an axial end of pulley 62. First and second end covers 70, 72 each also include cylindrical second portion 78 extending axially along central axis C, the axially inward end of which is attached to first portion 74 about central aperture 76 therein. Each adjacent pair of abutting first and second portions 74, 78 define hole 80 radially centered about central axis C, and extending along central axis C and into container central cavity 68. First and second end covers 70, 72 may be attached to pulley 62 by press fit, welding, or any other suitable method known to those skilled in the art, to define ball-nut container 66.

Each of the first and second ball-nut container end covers 70, 72 has axial inner surface 82 and opposing axial outer surface 84. More specifically, each planar, annular first portion 74 of first and second end covers 70, 72 has inner and outer surface 82, 84. As shown, inner surface 82 of first end cover 70 faces inner surface 82 of second end cover 72 in a spaced relationship along central axis C.

First portion 74 of each of first and second end covers 70, 72 defines first groove 86 extending about and radially centered on central axis C, with each first groove 86 facing and aligned with the other relative to central axis C. More specifically, inner surface 82 of first portion 74 of each of first and second end covers 70, 72 defines first groove 86 with first groove 86 extending circumferentially about central axis C. First groove 86 is discussed further below.

Pulleys 54, 62 and end covers 70, 72 of ball-nut container 66 may be constructed out of any type of material, including a ferrous material such as, for example, 1020 cold rolled steel, plastic, or a lightweight material such as an aluminum alloy or composites. Notably, aluminum alloy or plastic materials may beneficially reduce overall mass and inertia of steering system 10, thereby improving responsiveness. The inner circumferential surface diameter of pulley 62 is preferably ground to provide a closely toleranced clearance to the outer diameter of the centering ring fixed to the ball-nut within isolator assembly 48, as described further below.

Figure 9:
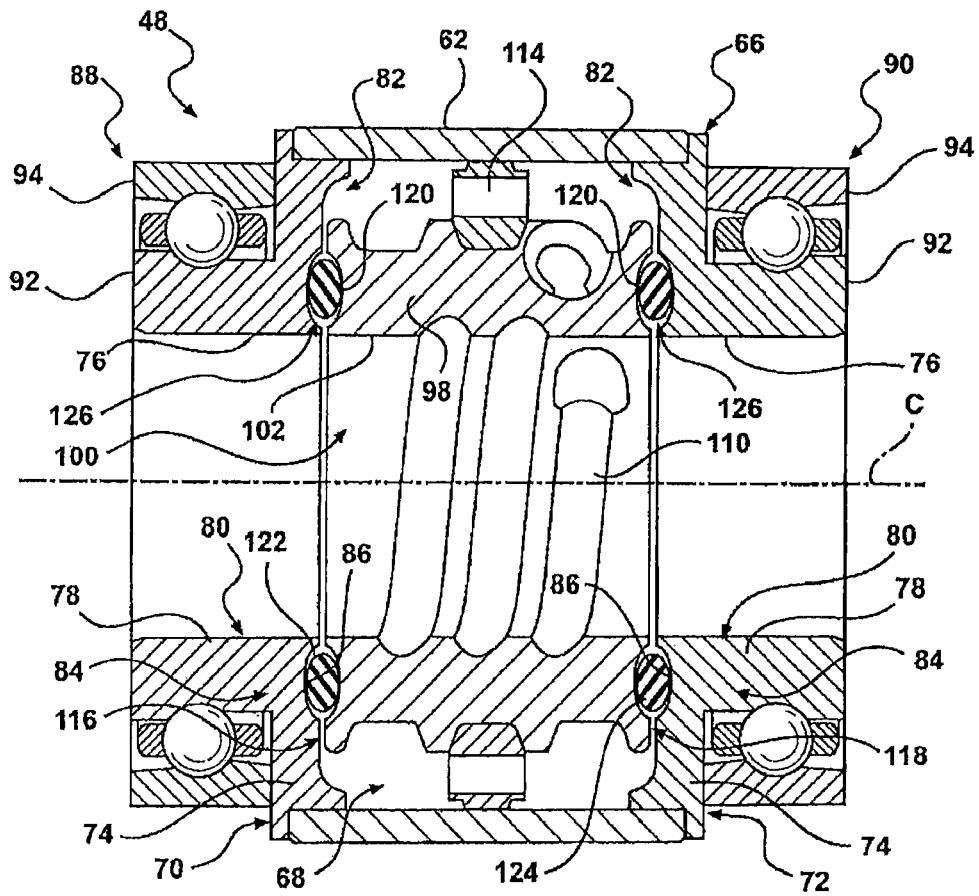
FIG. 9 is a cross-sectional view similar to FIG. 5 showing bearing inner races incorporated into the container of the isolator assembly.

Referring still to FIGS. 3-5, two angular contact bearings 88 and 90 of a type well-known in the art are positioned on the opposing sides of ball-nut container 66, adjacent first and second end covers 70, 72. More specifically, bearings 88, 90 abut first and second portions 74, 78 of first and second end covers 70, 72. Inner race 92 of bearings 88, 90 may axially abut outer surface 84 of radial portions 74, and be slidably disposed upon cylindrical second portions 78, of the respective first and second end covers 70, 72 to radially and axially support ball-nut container 66 relative to gear assembly housing 64 into which outer bearing races 94 are fitted. Alternatively, instead of inner races 92 of bearings 88, 90 being slidably received on cylindrical second portions 78 of first and second end covers 70, 72, these cylindrical second portions 78 may be structured to themselves form inner races 92 of bearings 88, 90, as shown in FIG. 9.

Angular contact bearings 88 and 90 support ball-nut container 66 within gear assembly housing 64 and allow ball-nut container 66 to rotate with movement of belt 58. Spring washers 96, such as wave washers may also be utilized to provide adjustment for angular contact bearings 88 and 90, as shown in FIG. 3. Alternatively, other types of bearings, e.g., deep groove bearings, could be used instead of angular contact bearings 88 and 90.

Disposed within central cavity 68 of ball-nut container 66 is ball-nut 98, spaced from pulley 62 and first and second end covers 70, 72. Ball-nut 98 has threaded bore or opening 100 extending therethrough defined by inner circumferential surface 102, through which is received ball-screw 44. Prior to installation of isolator assembly 48 onto ball-screw 44, the central axis of ball-nut bore 100 and axis C of container 66 are coincident, as they are subsequent to its installation when axes C and A are collinear. Misalignment of axes C and A will force ball-nut 98 to be reoriented within container 66, the central axis of its bore 100 realigned with axis A of ball-screw 44.

Inner circumferential surface 102 of ball-nut 98 slidably engages outer circumferential surface 104 of ball-screw 44. Ball-nut bore 100 generally aligns itself with rack axis A in gear assembly 30 through the cooperative sliding, engagement of cylindrical surfaces 102 and 104. Balls 106 are disposed in ball groove 108 of ball-screw 44 and mating ball groove 110 of ball-nut 98 in the well-know manner, with ball-nut provided with a suitable, well-known means such as a cross-over tube (not shown) for recirculating balls 106 from one end of groove 110 to the other, and capturing balls 106 within the axial length of rotatable ball-nut 98. Ball-screw 44 and ball-nut 98 are thus threadably engaged through balls 106 disposed in their corresponding ball grooves or threads 108, 110, respectively. Ball-screw 44 and isolator assembly 48 together provide rotary-to-linear mechanism or ball-screw assembly 112.

As noted above, in the unstressed state of mechanism 112, ball-screw axis A is typically aligned with central axis C of ball-nut container 66. More specifically, ball-screw shaft 44, container 66 and ball-nut 98 are typically radially centered on both rack axis A and collinear central axis C. In prior ball-screw assemblies, if the ball-screw axis and the ball-nut axis become misaligned through stresses acting on rack 32 that cause it to flex or bend slightly, high reaction loads are typically created on the ball-nut, thus increasing friction between the ball-screw and the ball-nut. Ball-nut 98 of gear assembly 30 is capable of moving axially within container 66 along its central axis C, and is also capable of moving radially relative to central axis C within container 66 and tilting relative to central axis C. In other words, ball-nut 98 has multiple degrees of freedom to compensate for various forces applied to ball-nut 98 and/or to compensate for misalignments of axes A and C, and between rack 32, ball-nut 98 and/or journaled container 66 of isolator assembly 48.

With mechanism 112 in an aligned state, holes 80 of first and second end covers 70, 72 are collinear with threaded bore 100 of ball-nut 98 along central axis C, and longitudinal axis A of ball-screw shaft 44 extending through holes 80 and bore 100 is substantially collinear with axis C. The orientation of ball-nut 98 within container 66 is varied with deflecting movement of rack 32 occurring when rack 32 is stressed, which tends to misalign axes A and C due to the sliding surface engagement between ball-nut surface 102 and ball-screw surface 104.

With mechanism 112 in a misaligned state, in which axes A and C are noncollinear due to bending and other elastic deformations of rack 32, ball-nut 98 moves radially or pivotally tilts with ball-screw 44 relative to container 66. Such misalignment is, to an appreciable level, accommodated by isolator assembly 48. Further, axially directed reaction forces between rack 32 and gear assembly housing 64 in the directions of arrows 52 will cause axial displacement of ball-nut 98 within container 66, which may occur in an aligned state with axes A and C collinear. To an appreciable level, such axial displacement, in which ball-nut 98 moves in an axial degree of freedom relative to container 66, is also accommodated by isolator assembly 48. Such accommodations for misalignment and/or axial deflection are made by providing ball-nut 98 with degrees of freedom in which to move within container 66 while maintaining the rotatable coupling therebetween through which torque is transferred.

Isolator assembly 48 provides ball-nut 98 with the necessary degrees of freedom and stiffness to allow isolator assembly 48 to operate adequately without causing excessive friction between ball-nut 98 and ball-screw 44, or loss of control to isolator assembly 48. A low conical or moment spring rate is utilized to reduce friction between ball-nut 98 and ball-screw 44 and a high axial or torque spring rate is utilized to maintain adequate control of isolator assembly 48. In other words, low stiffness and/or low spring rate is utilized to reduce friction between isolator assembly 48 and ball-screw 44, and high axial/torque stiffness and/or high spring rate is utilized to maintain adequate control of isolator assembly 48.

Figure 10:
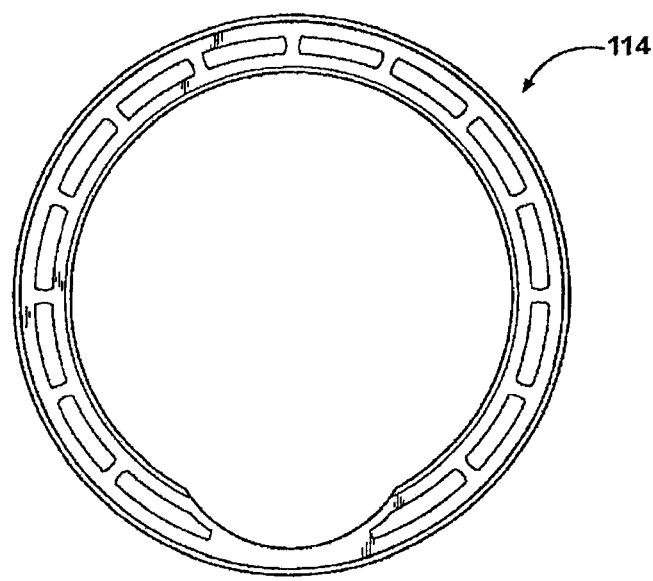
FIG. 10 is an axial end view of the centering ring of the isolator assembly.

Centering ring 114 is interference fitted to the outer circumference of ball-nut 98 and is radially disposed between ball-nut 98 and the inner circumferential surface of pulley 62. Preferably, there is a slight circumferential clearance between the annular outer peripheral edge of centering ring 114 and the inner circumferential cylindrical surface of pulley 62. For example, the centering ring 114 and pulley 62 may have a nominal radial clearance fit 0.065 mm. Centering ring 114 applies a radially-directed load to ball-nut 98 when it becomes radially nonconcentric with container 66 beyond the provided radial clearance due to axes A and C becoming radially separated. Centering ring 114 thus limits the radial extent by which ball-nut 98 may deviate from central axis C and tends to center ball-nut 98 radially within container 66. Centering ring 114 is annular and lies in a plane normal to the central axis of ball-nut bore 100. Centering ring 114 is positioned axially along the length of ball-nut 98 such that it is axially centered within cavity 68, and thus ball-nut 98 can pivot slightly within container 66, at or near the center of ring 114, due to relative tilting between axes A and C. Centering ring 114 may be formed from a polymeric material such as a polyamide (e.g. nylon or fiberglass reinforced nylon) or any other suitable material known to those skilled in the art. For example, centering ring 114 may be formed from nylon 6/6 33% GFR widely available commercially. As shown in FIG. 10, the inner diameter of centering ring 114 is provided with a circumferentially-localized relief accommodating the ball-nut cross-over tube (not shown).

Ball-nut 98 may be formed from SAE J404 8620H aluminum-killed steel, which is hardened then ground. Ball-nut 98 includes first face 116 and second face 118 opposing first face 116, and more specifically first and second faces 116, 118 are spaced from each other along central axis C. Inner surface 82 of first end cover 70 faces first face 116 of ball-nut 98, and inner surface 82 of second end cover 72 faces second face 118 of ball-nut 98. Each of first and second faces 116, 118 of ball-nut 98 defines annular second groove 120 extending centrally about central axis C, with second grooves 120 aligned with each other along central axis C. More specifically, first groove 86 of first end cover 70 is aligned with second groove 120 of first face 116 of ball-nut 98, and first groove 86 of second end cover 72 is aligned with second groove 120 of second face 118 of ball-nut 98. Second groove 120 extends circumferentially about central axis C as similarly described regarding first groove 86. Toroidal cavity 126 is defined by each respective pair of first and second grooves 86, 120 and may have a cross-section that is configured as a perfect-ellipse. It is to be appreciated that each superposed pair of first and second grooves 86, 120 defines toroidal cavity 126, albeit a toroidal cavity having a non-continuous wall due to gaps 128 separating superposed ball-nut surfaces 116, 118 and inwardly-facing end cover surfaces 82. Further, it is to be understood that each toroidal cavity 126 may have a cross-section of another suitable configuration, such as circular, elliptical, rectangular, trapezoidal, trough, etc. First and second grooves 86, 120, in conjunction with elastomeric isolator members disposed therein, provide high axial stiffness and/or high torque stiffness to the isolator assembly 48, as discussed further below.

As best seen in FIG. 5, first elastomeric isolator member 122 is disposed between first face 116 of ball-nut 98 and inner surface 82 of first end cover 70, and second elastomeric isolator member 124 is disposed between second face 118 of ball-nut 98 and inner surface 82 of second end cover 72. More specifically, first isolator member 122 is disposed between first groove 86 of inner surface 82 of first end cover 70 and second groove 120 of first face 116 of ball-nut 98 and additionally, second isolator member 124 is disposed between first groove 86 of inner surface 82 of second end cover 72 and second groove 120 of second face 118 of ball-nut 98. First and second isolator members 122, 124 are axially aligned with each other and concentric relative to central axis C for providing even loading between ball-nut 98 and container 66 of isolator assembly 48.

First and second isolator members 122, 124 each may be defined as an elastomeric o-ring. In their natural, uncompressed states, first and second isolator members 122, 124 may define a cross-section having a circular configuration. It is to be appreciated that first and second o-rings 122, 124 may define any other suitable cross-sectional configuration, such as rectangular, square, triangular, etc. First and second isolator members 122, 124 are typically formed from a polymeric material, such as a fluoro-carbon material such as VM835 available from Parker Hannifin Corporation, or any other suitable elastic material, such that first and second isolator members 122, 124 are compressible and return to their original configuration when uncompressed. In other words, first and second isolator members 122, 124 have spring-like properties such that first and second isolator members 122, 124 are not permanently deformed when compressed. Moreover, isolator members 122, 124 also have material and surface finish properties suitable for frictionally engaging the abutting surfaces of grooves 86, 120 and internally accommodating shear stresses to facilitate torque transmission between container 66 and ball-nut 98 through members 122, 124. Isolator members 122, 124 carry a shear load equal to the torque applied to ball-nut 98 by container 66, and with this shear stress, members 122, 124 undergo shear deformation as ball-nut 98 moves in an angular degree of freedom relative to container 66. Through this shear deformation, isolator assembly 48 provides ball-nut 98 with a limited degree of freedom rotationally relative to container 66. The amount of torque transferable between container 66 and ball-nut 98 is limited by a threshold torque at which maximum frictional engagement between members 122, 124 and the walls of their respective toroidal cavities 126 is overcome and slippage occurs.

Figure 6:
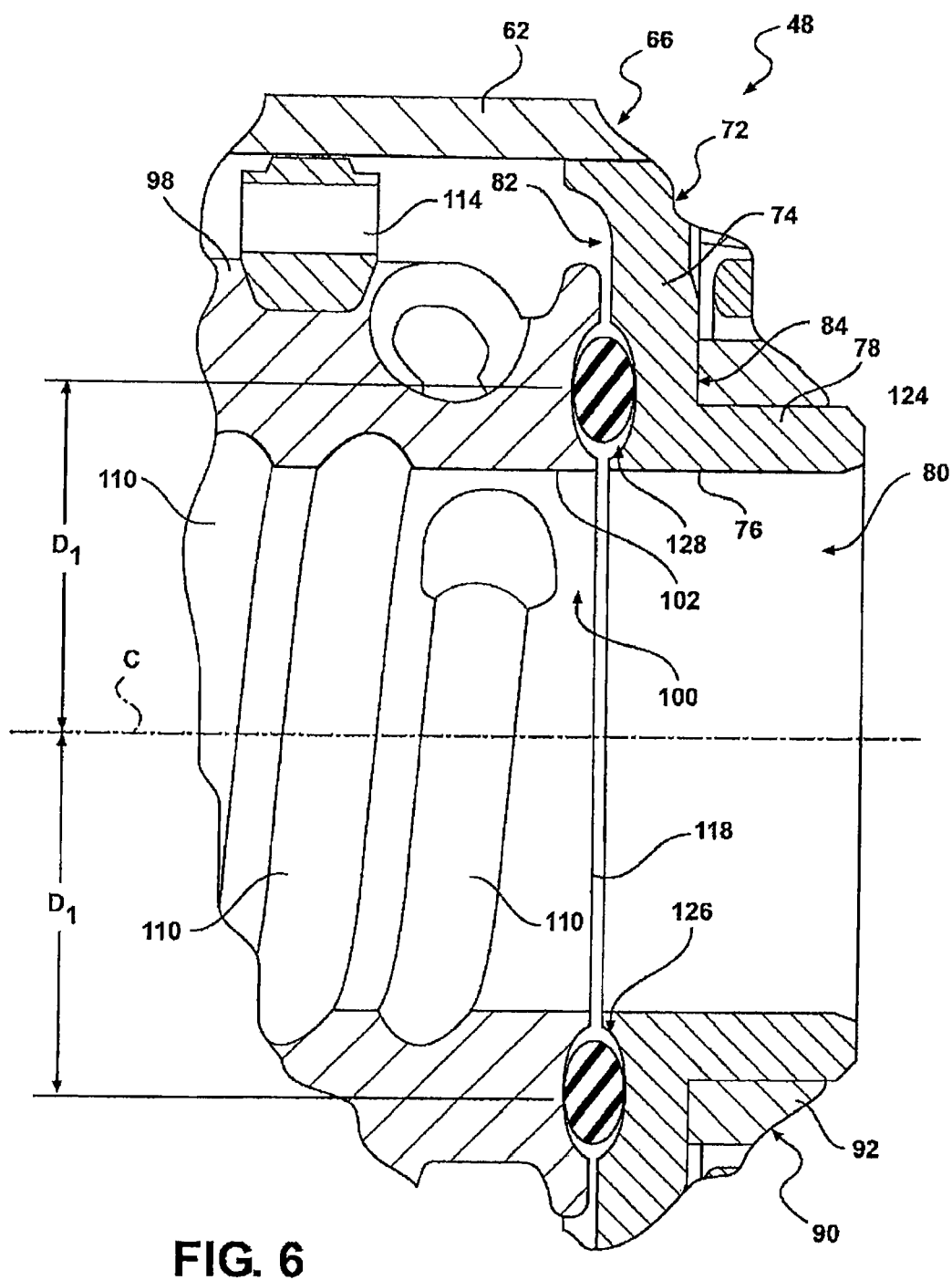
FIG. 6 is an enlarged, fragmented view of the isolator assembly of FIG. 5 wherein the elastomeric isolator member partially fills its toroidal cavity.
Figure 7:
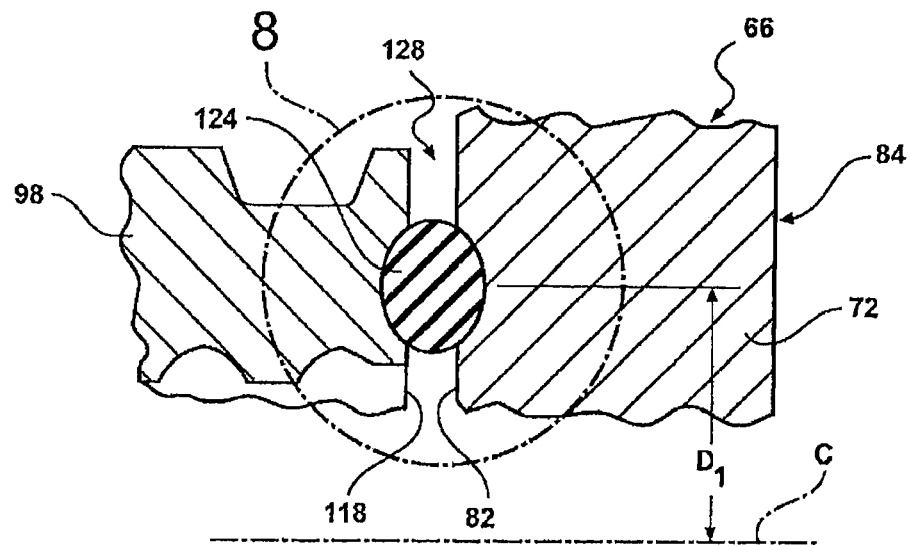
FIG. 7 is a fragmented view of an isolator assembly wherein the elastomeric isolator member entirely fills its toroidal cavity.
Figure 8:
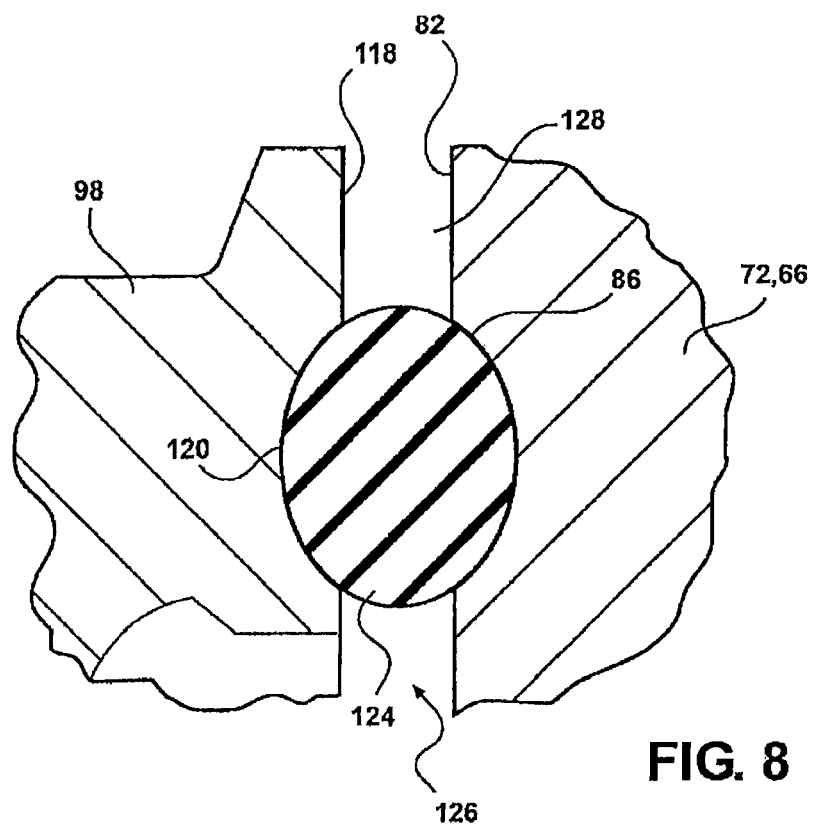
FIG. 8 is an enlarged view of encircled portion 8 shown in FIG. 7.

When assembling isolator assembly 48, first and second isolator members 122, 124 are disposed in toroidal cavities 126 and compressed therein between ball-nut 98 and first and second end covers 70, 72 to achieve a desired load. More specifically, first and second isolator members 122, 124 are deformingly compressed within their respective mating pairs of first and second grooves 86, 120, as best shown in FIGS. 5-9. Thus, upon assembly of isolator assembly 48, elastomeric isolator members 122, 124 have a first elastic deformation in compression between container 66 and ball-nut 98. It is to be appreciated that first and second isolator members 122, 124 may be compressed such that they are elastically deformed to substantially fill the entire volumes of their respective first and second grooves 86, 120 as shown in FIGS. 7 and 8, or to only partially fill their respective first and second grooves 86, 120 as shown in FIG. 6. Having first and second isolator members 122, 124 fill the entire volumes of their respective mating pairs of first and second grooves 86, 120 increases the modulus or stiffness of isolator assembly 48.

The desired conical or moment spring rate of isolator assembly 48 is achieved by centering first and second isolator members 122, 124 relative to central axis C. Further, by reducing a moment arm of first and second isolator members 122, 124 relative to central axis C, a reaction moment on ball-nut 98 is reduced. In other words, the reaction moments of first and second isolator members 122, 124 are reduced by reducing a distance $D_1$ such that first and second isolator members 122, 124 are positioned away from central axis C, as shown in FIGS. 6 and 7. It is to be understood that although distance $D_1$ is illustrated only for second isolator member 124, isolator assembly 48 includes substantially the same distance $D_1$ for first isolator member 122. The conic or moment spring rate may be changed by varying the cross-sectional configuration and/or diameter of first and second isolator members 122, 124, the nominal diameter ($2 \times D_1$) of first and second isolator members 122, 124, the durometer or hardness of first and second isolator members 122, 124, and/or the configuration or volume of first and second grooves 86, 120.

Thus, it is to be understood that first and second isolator members 122, 124 have a first elastic deformation achieved during assembly of isolator assembly 48, and at which the central axis of ball-nut bore 100 (which substantially coincides with ball-screw axis A) is collinear with container central axis C, ball-nut 98 is substantially axially centered within cavity 68 of container 66, and there is no appreciable torque transfer between container 66 and ball-nut 98. It is to be further understood that movement of ball-nut 98 in any of its multiple degrees of freedom relative to container 66, whether it be radial relative to axis C through parallel separation or nonparallel tilting of axes A and C (reflecting a state of misalignment between axes A and C), axial along axis C (reflecting axial displacement of ball-nut 98 toward either of container end covers 70 and 72), and/or angularly about axis C (reflecting torque transfer between container 66 and ball-nut 98), is opposed by a second elastic deformation of annular isolator members 122, 124.

Figure 2:
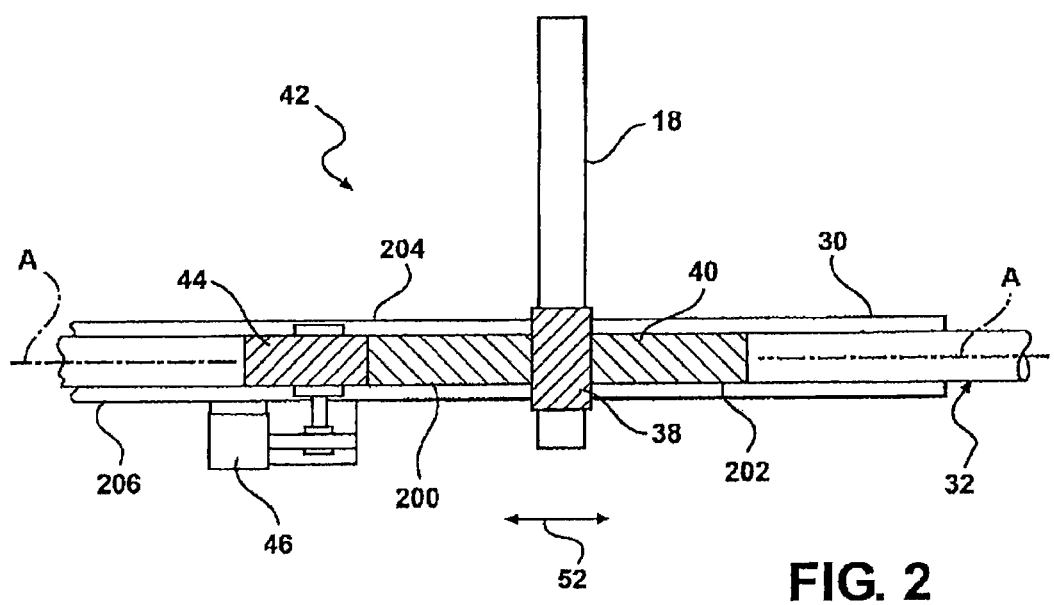
FIG. 2 is a schematic illustration of a portion of the steering system in FIG. 1.

Referring to FIGS. 1-3, the operation of steering system 10 having steering gear assembly 30 including rotary-to-linear mechanism 112 is as follows. When the operator of the vehicle turns hand wheel 20, torque sensor 22 and position sensor 24 detect the steering angle of hand wheel 20. Torque sensor 22 and position sensor 24 send signals to controller 26, which then provides a controlling signal to motor 46, which rotates in one of two opposite directions. In so rotating, motor 46 provides a torque to pulley 54 via shaft 50. The rotational torque of pulley 54 is transferred via belt 58 to pulley 62 of isolator assembly 48. Alternatively, belt 58 and pulleys 54, 62 may be replaced by a chain or gear system to provide a rotational torque to ball-nut container 66. Accordingly, motor 46, shaft 50, pulleys 54 and 62, and belt 58 provide a rotary-to-rotary conversion determined by the dimensions of pulleys 54 and 62 with respect to each other (e.g., their drive ratio). As noted above, pulley 62 defines the outer circumferential surface of ball-nut container 66. Alternatively, a separate pulley 62 may be disposed about and rotatably fixed to an exterior surface of ball-nut container 66.

Torque-inducing force applied to pulley 62 through belt 58 rotates ball-nut container 66. Friction between isolator members 122, 124 and grooves 86, 120 of ball-nut container 66 and ball-nut 98 transmits the applied torque therebetween, which causes ball-nut 98 to rotate. Rotational force on ball-nut 98 is converted, through the interaction of balls 106 and ball grooves 108 and 110 of rotary-to-linear mechanism 112, into a linear force on ball-screw 44, which urges linear movement of rack 32 and thereby assists the force, being applied to rack 32 via rotary-to-linear actuation of rack and pinion gear set 42. When ball-nut 98 rotates, there is an engagement of ball-screw 44 and ball-nut 98 that causes ball-screw 44 to move in a linear direction. The movement of ball-screw 44 correspondingly moves or assists movement of rack 32 in a linear direction along axis A, in the directions of arrows 52. Of course, the direction of movement of rack 32 corresponds to the controlled rotational direction of driving pulley 54.

Power assist steering system 10 illustrated in FIGS. 1 and 2, the operation of which is described above, includes a mechanical connection, via rack and pinion gear set 42, between hand wheel 20 and rack 32. In alternative, "steer-by-wire" systems there is no such direct mechanical connection between hand wheel 20 and rack 32. In such systems, similarly sensed rotational movement of hand wheel 20 by the driver (and/or a signal from an equivalent driver control device) is input into controller 26 while motor 46 provides the necessary force to manipulate rack 32. Thus, above-described rotary-to-linear mechanism 112 may be similarly utilized in steer-by-wire systems. In addition, it is also important to note that while mechanism 112 has been described as being incorporated into a steering system, it or its isolator assembly 48 can be beneficially incorporated into any mechanism that can utilize a ball-screw assembly.

Isolator assembly 48 provides additional degrees of freedom to a ball-screw assembly in any type of mechanism it is incorporated into, which includes a steering mechanism. Isolator assembly 48 can provide degrees of freedom to a steering mechanism by allowing rack 32 and ball-screw 44 to deflect in any direction, including axially, torsionally, angularly and/or radially, while at the same time providing an acceptable load carrying capability and without overloading bearings 88, 90 and the rotary-to-linear mechanism or ball-screw assembly 112. In addition, by controlling the torsional stiffness, axial stiffness, and radial stiffness through material choice and structural configuration of isolator members 122, 124 and design of toroidal cavity 126, the vibration and the deflections of rack 32 and rotary-to-linear mechanism 112 can be controlled to obtain desired results.

While the invention has been described with reference to a limited number of embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A rotary- to-linear mechanism comprising:
a elongate linearly-moveable first member having a longitudinal first axis;
a rotatably-moveable second member rotatably disposed about said first member, said second member defining a second axis about which it is rotatable and having interior surfaces between which is a central cavity through which said first and second axes extend;
a rotatably-moveable third member encircling said first axis and operatively engaged with said first member, linear movement of said first member along said first axis relative to said third member induced by rotational movement of said third member about said first axis relative to said first member, said third member disposed in said central cavity, said third member having an axial surface superposing a said second member interior surface, said superposed surfaces each defining one of a pair of corresponding grooves, each of said grooves encircling said first and second axes; and
an annular elastomeric isolator member disposed in said pair of corresponding grooves, and having a first elastic deformation in compression between said second and third members, said annular isolator member having frictional engagement with surfaces of said pair of corresponding grooves, said second and third members rotatably coupled through said frictional engagement, said third member having multiple degrees of freedom relative to said second member, relative movement between said second and third members opposed by a second elastic deformation of said annular isolator member.

2. The rotary-to-linear mechanism of claim 1, wherein said rotatably-moveable second and third members and said isolator member comprise an isolator assembly separable from said first member.

3. The rotary-to-linear mechanism of claim 1, wherein said third member is rotatable about said first axis with rotation of said second member about said second axis.

4. The rotary-to-linear mechanism of claim 1, wherein said superposed surfaces are separated by a therebetween, said isolator traversing said gap.

5. The rotary-to-linear mechanism of claim 1, wherein said pair of corresponding grooves defines a substantially toroidal cavity, said isolator member disposed in said toroidal cavity.

6. The rotary-to-linear mechanism of claim 5, wherein said toroidal cavity defines a cross-section that is substantially elliptical.

7. The rotary-to-linear mechanism of claim 5, wherein said elastically deformed isolator member only partially fills said toroidal cavity.

8. The rotary-to-linear mechanism of claim 5, wherein said elastically deformed isolator member substantially entirely fills said toroidal cavity.

9. The rotary-to-linear mechanism of claim 1, further comprising an outer circumferential surface defined by said first member and an inner circumferential surface defined by said third, said outer and inner circumferential surfaces slidably engaged, and wherein said mechanism has aligned and misaligned states, said first and second axes collinear in said aligned state and noncollinear in said misaligned state, said third member moved with said first member and relative to said second member as said mechanism is moved between its said aligned and misaligned states.

10. The rotary-to-linear mechanism of claim 9, wherein first member and said third member are threadably engaged with each other.

11. The rotary-to-linear mechanism of claim 10, further comprising a plurality of balls and respective cooperating grooves provided in said outer and inner circumferential surfaces, said balls disposed in said cooperating grooves, and wherein said first and third members are threadably engaged through said balls and said cooperating grooves.

12. The rotary-to-linear mechanism of claim 1, wherein said second member comprises a cylindrical central portion disposed between a pair of end covers, each said end cover having a cylindrical portion extending axially outward relative to said central portion, said central portion having a diameter greater than the diameter of each said end cover cylindrical portion, said central portion and said end cover cylindrical portions radially centered about said second axis, each said end cover having a wall portion extending radially outward relative to said second axis from the outer cylindrical wall of each said end cover cylindrical portion to said cylindrical central portion, said end cover wall portions and said central portion defining said central cavity.

13. The rotary-to-linear mechanism of claim 12, wherein said second member central portion has a cylindrical inner surface, and further comprising a centering ring fixed to said third member, said centering lying in a plane substantially normal to said first axis and axially located substantially centrally between opposed axial end surfaces of said third member, said centering ring having an outer periphery radially spaced from said cylindrical surface of said second member central portion.

14. The rotary-to-linear mechanism of claim 12, wherein said second member end cover wall portions define said interior surfaces between which is said central cavity, and one of said pair of corresponding grooves is defined in each said second member end cover wall portion.

15. The rotary-to-linear mechanism of claim 12, further comprising a bearing having relatively rotatable inner and outer races disposed about each said second member end cover cylindrical portion, said second member rotatable relative to said bearing outer races.

16. The rotary-to-linear mechanism of claim 15, wherein each said bearing has an inner race slidably received onto a said second member end cover cylindrical portion.

17. The rotary-to-linear mechanism of claim 15, wherein each said second member end cover cylindrical portion defines a said bearing inner race.

18. A combination comprising the rotary-to-linear mechanism of claim 1, a linearly moveable rack comprising said first member, and a reversibly rotatable motor operably engaged said second member, wherein linear movement of said rack is urged by linear movement of said first member along said first axis relative to said third member that is induced by rotational movement of said third member about said first relative to said first member.

19. A combination comprising the rotary-to-linear mechanism of claim 1, a linearly-moveable rack comprising said first member, a reversibly rotatable motor operably engaged with said second member, and a rack and pinion gear set comprising a pinion gear and a matching toothed portion of said rack, the teeth of which are engaged, wherein linear movement of said rack is urged by rotation of said pinion gear and by linear movement of said first member along said first axis relative to said third member that is induced by rotational movement of said third member about said first axis relative to said first member.

20. An isolator assembly for use with a ball-screw in a rotary-to-linear mechanism, comprising:
  a rotatably-moveable container defining a container axis about which it is rotatable and having interior surfaces between which is a central cavity through which said container axis extends;
  a rotatably-moveable ball-nut having a bore through which said container axis extends, said ball-nut disposed in said central cavity, said ball-nut having opposing axial surfaces superposing said container interior surfaces, said superposed surfaces each defining one of a pair of corresponding grooves, each of said grooves encircling said container axis; and
  an annular elastomeric isolator member disposed in each said pair of corresponding grooves, and having a first elastic deformation in compression between said container and said ball-nut, each said annular isolator member having frictional engagement with surfaces of its respective said pair of corresponding grooves, said container and said ball-nut rotatably coupled through said frictional engagement, said ball-nut having multiple degrees of freedom relative to said container, relative movement between said container and said ball-nut opposed by a second elastic deformation of said annular isolator member.

* * * * *